United States Patent [19]

Hirano

[11] Patent Number: 4,797,869
[45] Date of Patent: Jan. 10, 1989

[54] DISK DETECTING APPARATUS

[75] Inventor: Toshio Hirano, Saitama, Japan

[73] Assignee: Pioneer Electronic Corporation, Tokyo, Japan

[21] Appl. No.: 74,121

[22] Filed: Jul. 16, 1987

[30] Foreign Application Priority Data

Jul. 16, 1986 [JP] Japan .................................. 61-167562

[51] Int. Cl.⁴ ........................ G11B 17/04; G11B 25/04
[52] U.S. Cl. ...................................... 369/75.2; 369/184
[58] Field of Search .................. 369/75.2, 265, 197, 369/198, 239, 267, 190, 184, 187, 188, 41

[56] References Cited

U.S. PATENT DOCUMENTS

| | | | |
|---|---|---|---|
| 3,941,392 | 3/1976 | Grosemans et al. | 369/239 |
| 3,966,330 | 6/1976 | Ridler et al. | 369/190 |
| 4,098,510 | 7/1978 | Suzuki et al. | 369/75.2 |
| 4,398,278 | 8/1983 | Suzuki | 369/41 |
| 4,528,653 | 7/1985 | Asaro | 369/41 |
| 4,695,995 | 9/1987 | Koizumi | 369/75.2 |

FOREIGN PATENT DOCUMENTS 32179  2/1985  Japan .................................. 369/197

*Primary Examiner*—Steven L. Stephan
*Attorney, Agent, or Firm*—Sughrue, Mion, Zinn, Macpeak, and Seas

[57] ABSTRACT

A disk detecting apparatus in which disks of different diameter are mounted and centered on a movable carrier having an extended radial aperture. As the carrier is inserted into the case of the disk player, a single detector detects the presence and size of any of the disks through the aperture.

9 Claims, 7 Drawing Sheets

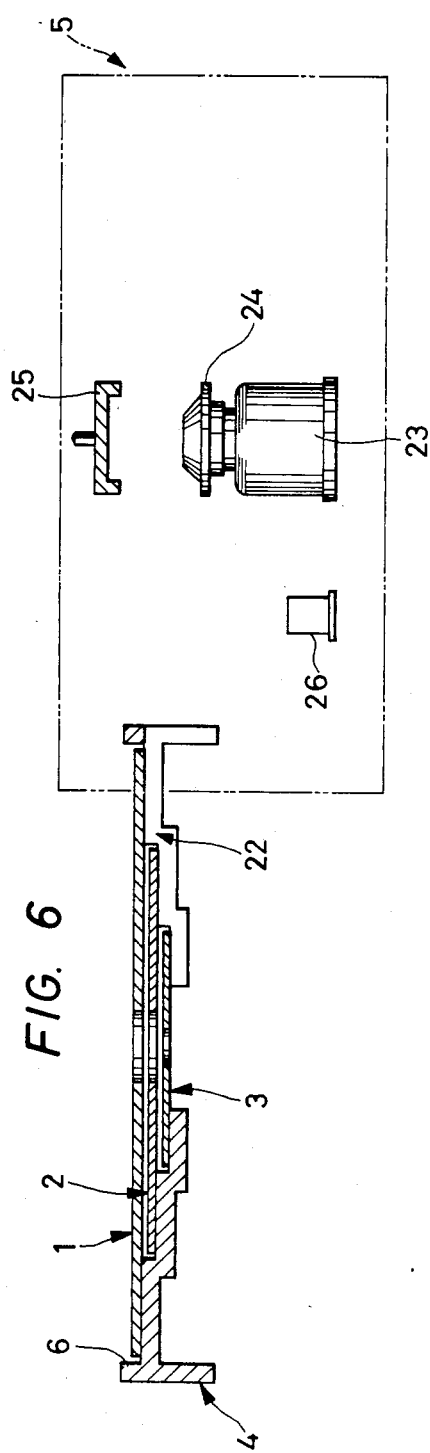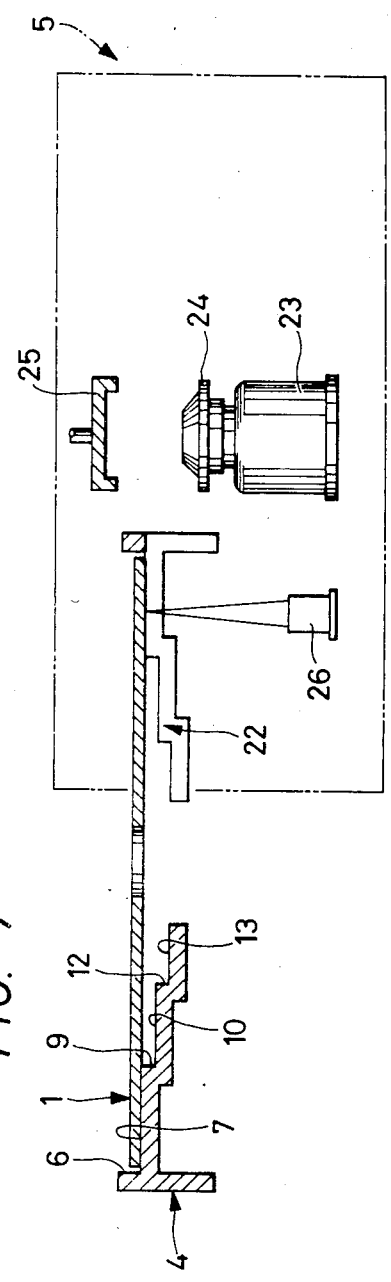

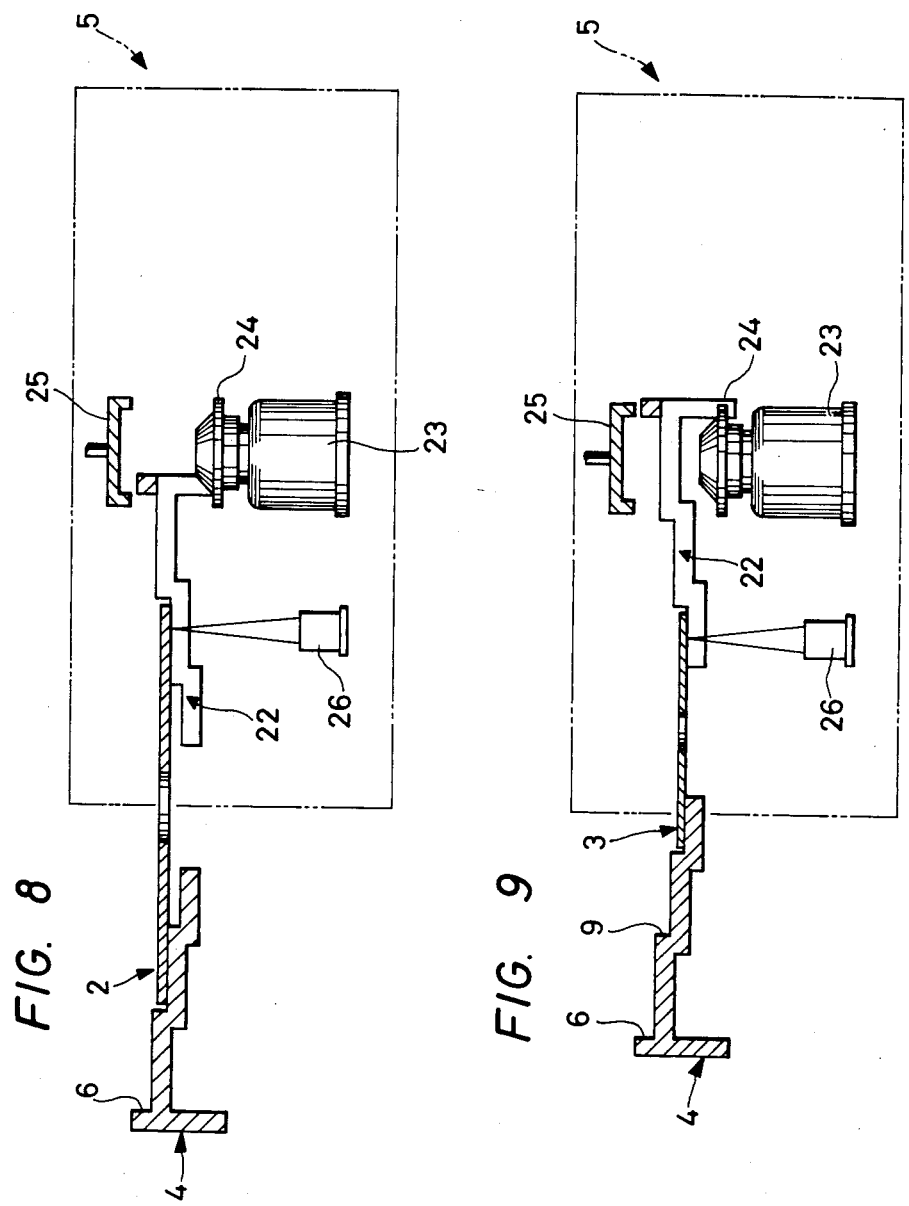

DISK DETECTING APPARATUS

BACKGROUND OF THE INVENTION

1. Field of the Invention

The present invention relates to a disk detecting apparatus in a multi-media player in which reproduction can be performed from video disks or digital audio disks of different diameter.

2. Background of the Invention

FIG. 1 is a perspective view showing a carrier for a conventional disk detecting apparatus in an optical disk player which is arranged to be able to play video disks, digital audio disks, or the like, of different diameter. Diagrams of FIGS. 2(a) and (b) explain the disk detecting operation by the carrier.

FIG. 2(a) shows a video disk 1 of 12 inches in diameter, a video disk 2 of 8 inches in diameter, and a digital audio disk 3 of 4.7 inches (hereinafter referred to as "5 inches") in diameter.

The above-mentioned disks are mounted on a carrier 4 which can be horizontally projected from and accommodated into a casing 5. On the carrier 4, there is provided a position restriction edge 6 constituted by a step or projecting portion for guiding an outer circumferential edge of the video disk 1 of 12 inches in diameter so as to mount the disk in a predetermined position. The video disk 1 is mounted on a disk mounting surface 7. Finger-hook recessed portions 8 are formed in the right and left side portions of the carrier 4 so that fingers of the user can be inserted to the lower surface of the outer circumferential portion of the video disk 1 when the video disk 1 is to be moved onto or from the disk mounting surface 7.

A position restriction edge 9 constituted by a step or projecting portion guides an outer circumferential edge of the video disk 2 of 8 inches in diameter so as to mount the video disk 2 in a predetermined position. The video disk 2 is mounted on a disk mounting surface 10. Finger-hook recessed portions 11 are formed in the right and left sides of the position restriction portion 9 so that fingers can be inserted to the lower surface of the outer circumferential portion of the video disk 2 when the video disk 2 is to be moved onto or from the disk mounting surface 11.

A position restriction edge 12 constituted by a step or projecting portion guides the digital audio disk 3 of 5 inches in diameter at its outer circumferential edge portion so as to mount the audio disk 3 in a predetermined position. The digital audio disk 3 is mounted on a disk mounting surface 13. A finger-hook recessed portion 14 is formed in this side of the position restriction portion 12 so that fingers can be inserted to the lower surface of the outer circumferential portion of the audio disk 3 when the digital audio disk 3 is to be moved onto or from the disk mounting surface 13.

Further, all of the above-mentioned circular position restriction portions 6, 8 and 12 are provided coaxially with each other. Holes 15, 16 and 17 are formed respectively in the disk mounting surfaces 13, 7, and 10 so that light radiated from detection means 19, 20 and 21, each constituted by a light emission diode and a photo detector fixed on a substrate 18, is reflected by the disks 1, 2, and 3, and the reflected light can be passed through the respective holes. An opening 22 in the carrier 4 allows movement of a not-shown pickup in a radial direction of the disks and the relative movement of a turntable 24 which will be described later. A driving motor 23 rotates the video disks 1 and 2. A turntable 24 is fixed on the rotary shaft of the motor 23. A clamper 25 clamps the disks.

When the carrier 4 is projected from the casing 5 and any one of the disks 1, 2 and 3 is mounted on the corresponding one of the disk mounting surfaces 7, 10, 13, the disk is guided by the corresponding one of the position restriction edges 6, 9, and 12 so as to be mounted on the corresponding one of the disk mounting surfaces 7, 10, and 13.

Then, the carrier 4 on which the selected one of the disks 1, 2, and 3 has been mounted is moved into the inside of the casing 5 so as to be positioned just above the turntable 24 (FIG. 2(a)). In that state, the carrier 4 is stopped once and the existence of the reflected light of the light emitted from the detection means 19, 20, and 21 is detected through the holes 15, 16, and 17.

All the detection means 19, 20 and 21 receive the reflected light when the largest disk 1 is mounted, both the detection means 19 and 20 receive the reflection light when the medium sized video disk 2 is mounted, and only the detection means 19 receives the reflection light when the smallest digital audio disk 3 is mounted. Thus, the kind of the mounted disk can be detected by the respective output signals from the detection means 19, 20 and 21.

The motor and the turntable to be positioned below the carrier 4 are selected to be the motor 23 and the turntable 24 for a video disk when either one of the video disks 1 and 2 has been mounted while a not-shown motor and a not-shown turntable for a digital audio disk are selected when the digital audio disk 3 has been mounted. After completion of the selection and change-over operation, the carrier 4 is moved downward. As a result, the selected disk is mounted on the corresponding turntable and clamped by the clamper 25. The carrier 4 descends to a position illustrated in FIG. 2(b) in which the carrier 4 does not prevent the disk from rotating and does not contact the detection means 19, 20 and 21. In this position, the carrier 4 stands by.

In the conventional disk detection apparatus, however, it is necessary to provide a plurality of the detection means 19, 20, and 21 corresponding to the kinds of the disks so that the circuit arrangement becomes complicated and raises the cost. Further, it is necessary to form the special holes 15, 16 and 17 in the carrier 4 corresponding to the detection means 19, 20 and 21 which degrade the appearance of the apparatus.

SUMMARY OF THE INVENTION

It is an object of the present invention to provide a disk detecting apparatus which comprises a carrier arranged to be able to mount a disk thereon and to be movable between a first position at which the disk is inserted into or removed from a casing and a second position at which the carrier stands by after mounting the disk on a turntable, driving means for moving the carrier between the first and second positions, a first detection means interlocked with the driving means so as to detect the position of the carrier, and a second detection means for detecting existence of the disk through an opening formed in a disk mounting surface of the carrier, whereby the number of the second detecting means can be reduced, and detecting holes are not formed in the carrier so that the appearance is made good.

BRIEF DESCRIPTION OF THE DRAWINGS

FIGS. 6 through 11 are explanatory views showing the operation steps of the carrier;

DETAILED DESCRIPTION OF THE PREFERRED EMBODIMENTS

Figure 4:
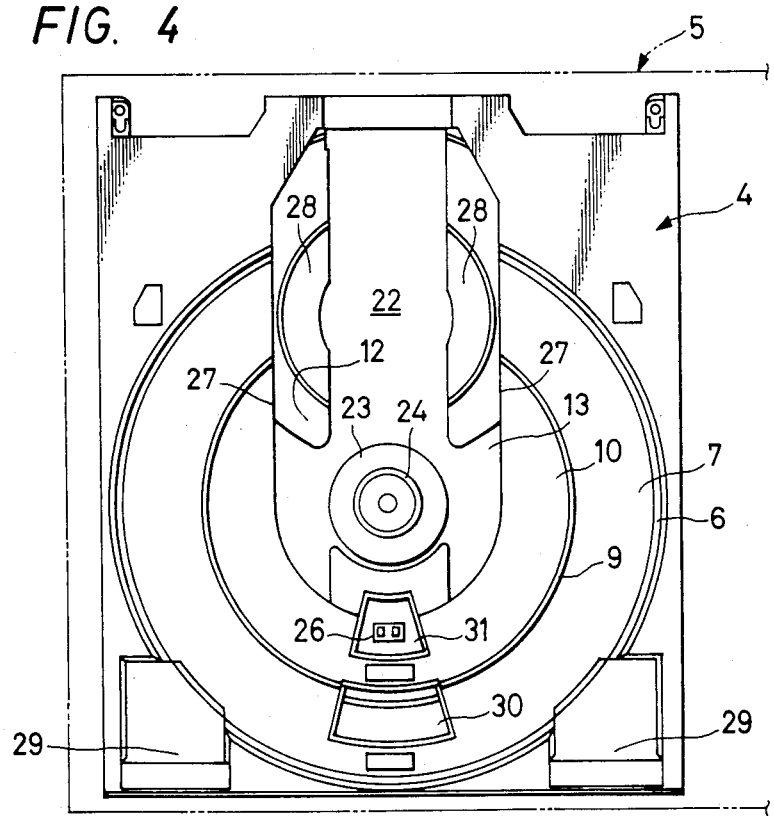
FIGS. 3 and 4 are plan views showing different operational states of a carrier to which the disk detection apparatus according to the present invention is applied.
Figure 3:
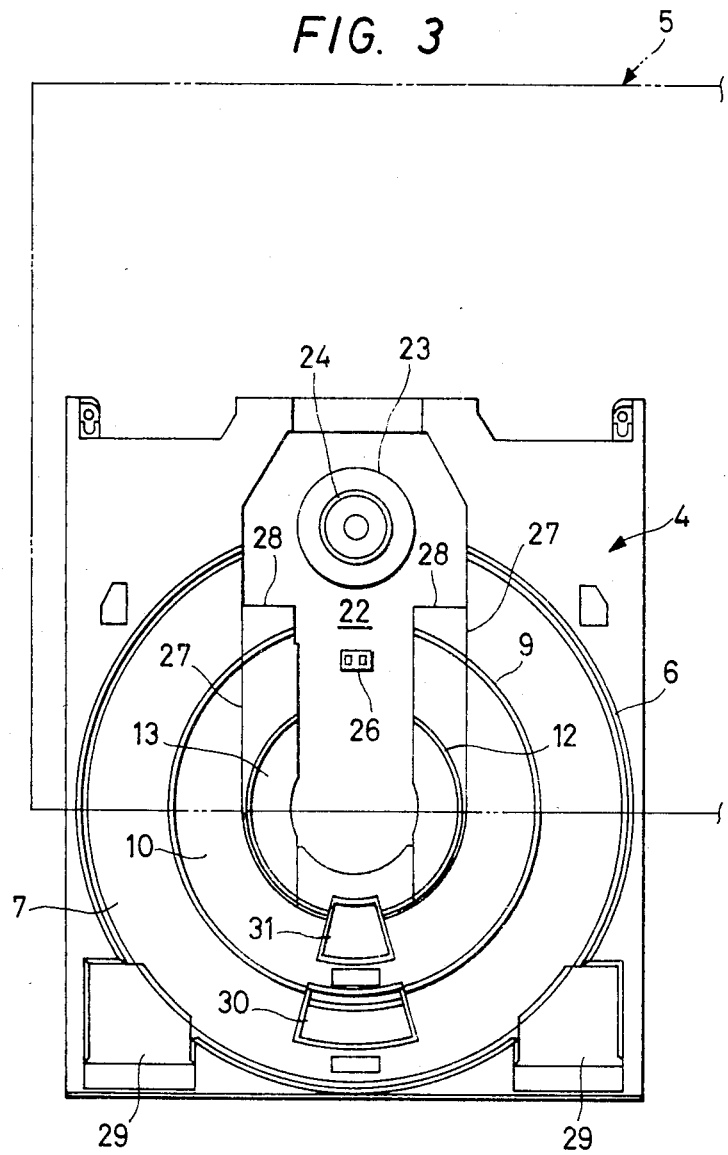

Description will be made hereunder as to an embodiment according to the present invention referring to accompanying drawings. FIGS. 3 and 4 are plan views showing different operation states of a carrier to which the disk detecting apparatus according to the present invention is applied. FIGS. 5 through 10 are explanatory views showing operational steps of the carrier.

Figure 1:
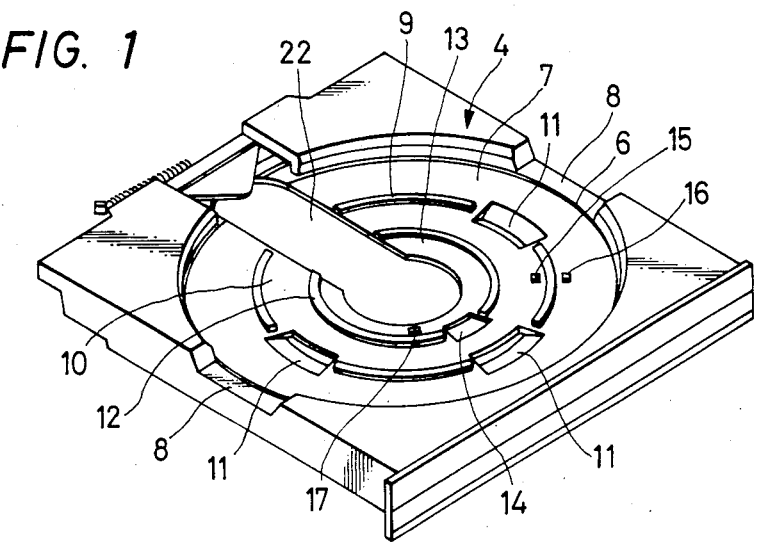
FIG. 1 is a perspective view of the carrier to which a conventional disk detection apparatus is applied.
Figure 2A:
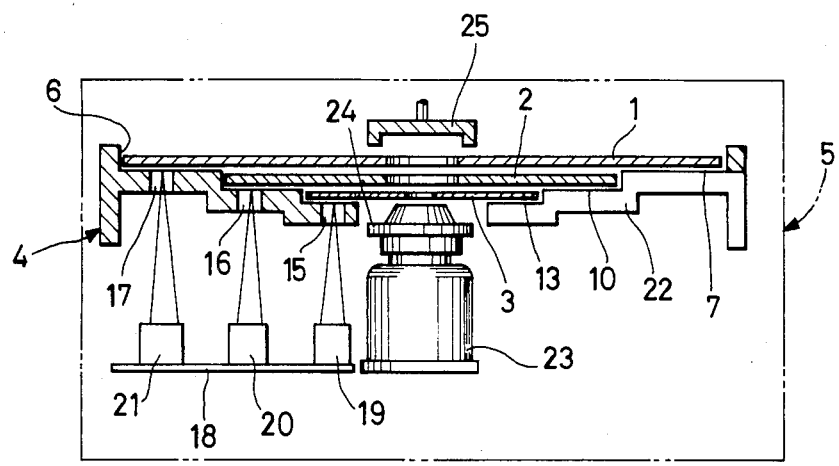
FIGS. 2(a) and 2(b) are explanatory views respectively showing disk detecting operations performed by the carrier of FIG. 1.
Figure 2B:
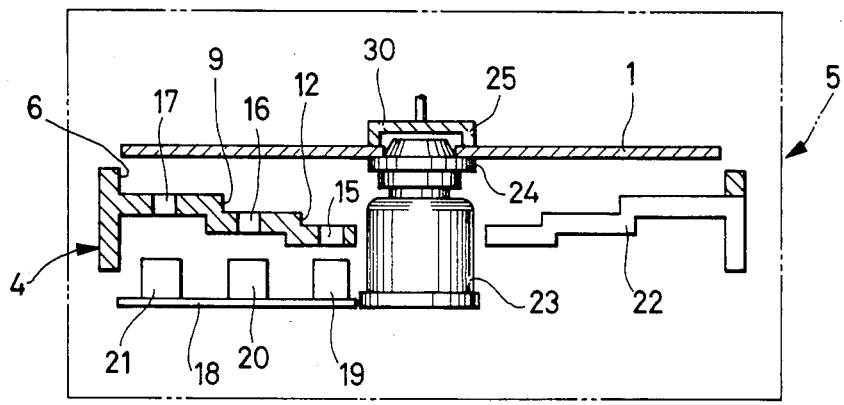

In the drawings, the items the same as or equivalent to those in FIGS. 1, 2(a), and 2(b) which have been described above are correspondingly referenced, and a description thereof is omitted. A description will be made only as to the portion relating to the present invention.

According to the present invention, only a single detection means 26 is provided as second detection means. In this second detection means 26, a reflection photo sensor is disposed below a carrier 4 at its loading position in a casing 5.

In the carrier 4, there is provided a movable portion 28 separated by a dividing line 27 from the remainder of the carrier 4 and arranged so as to be movable backwards while leaving the other portions of the carrier 4. That is, the disk mounting surface 13 for mounting a digital audio disk 3 moves backwards.

Further, finger-hook recessed portions 29 are provided in the carrier 4 at its left and right sides. A finger-hook recessed portion 30 is formed in the largest disk mounting surface 7 on this side and a finger-hook recessed portion 31 is formed in a mid-size disk mounting surface 10 also in this side. Video disks 1, 2, or a digital audio disk 3 can be held by its outer circumferential edge portion by fingers through the finger-hook recessed portion 31, 30 or 29 respectively.

Figure 5:
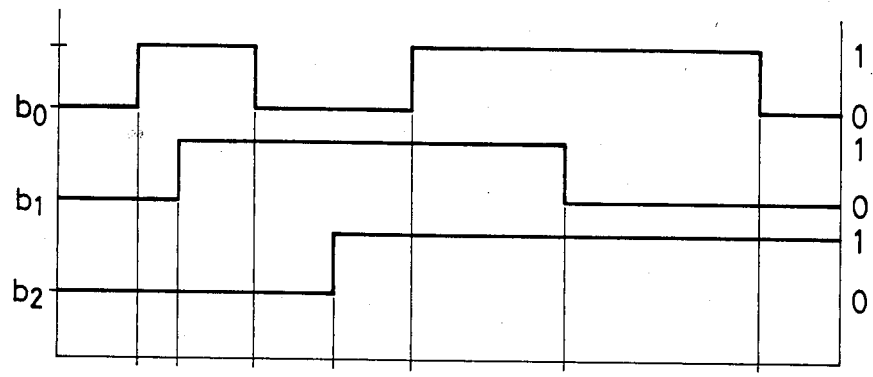
FIG. 5 is a mode diagram of a first position detection means for detecting a position of the carrier.

Next, referring to FIG. 5, the operation of the above-mentioned embodiment will be described. FIG. 5 is a mode diagram showing the operation modes of the first position detection menas for detecting the position of the carrier 4.

As shown in FIG. 6 in a first position where the carrier 4 is drawn out of the casing 5, a selected one of the disks 1, 2 and 3 can be mounted on the carrier 4. At that time, the selected disk is mounted on a corresponding one of the disk mounting surfaces 7, 10, and 13 through the corresponding one of the position restriction edges 6, 9 and 12.

The carrier 4 on which the selected disk has been mounted is inserted into the inside of the casing 5, and at this time, a not-shown loading mechanism is actuated so that the carrier 4 is thereafter automatically moved into the inside of the casing 5.

When the carrier 4 has been moved to the detection positions shown in FIGS. 7 through 9, the second detection means 26 is located below an opening portion 22 of the carrier 4.

In the first detection means for detecting the positions of the carrier 4, which positions are different from each other when the second detection means 26 detects the edge of one of the various disks to be mounted, a not-shown rotary encoder with a 3-bit Gray code and coupled to the motor of the driving means is used so that the above-mentioned detection positions are predetermined corresponding to the code patterns of the encoder.

FIG. 7 shows the case of detecting the video disk 1 of 12 inches, in which the detecting position of the carrier 4 is at the outside of the video disk 2 of 8 inches and at the position where the reflection surface of the video disk 1 of 12 inches is disposed just above the second detection means 26 which is a reflection photo sensor.

FIG. 8 shows the case of detecting the video disk 2 of 8 inches, in which the detecting position of the carrier 4 is at the outside of the digital audio disk 3 and at the position where the reflection surface of the video disk 2 of 8 inches is disposed just above the second detection means 26.

Further, FIG. 9 shows the case of detecting the position of the digital audio disk 3 of 5 inches, in which the detecting position of the carrier 4 is at the position where the reflection surface of the digital audio disk 3 is just above the second detection means 26.

When the carrier 4 is located in the respective detection positions, the existence of the reflected light (or the strength thereof may be utilized) from the second detection means 26 is detected through the opening portion 22. That is, at the respective detection positions, the opening 22 of the carrier 4 is utilized as a hole for recognizing the kinds of the disk or the existence thereof.

Accordingly, it is not necessary to form special holes in the disk mounting surface 7, 10 and 13 unlike conventional apparatus.

As described above, recognition of the kind of the selectively mounted disk and the existence thereof is detected at the three positions shown in FIGS. 7 through 9. At this time, the output of the second detection means 26 varies in such a manner as shown in the table listed below. Accordingly, it is possible to recognize the kind of the disk or existence thereof by a not-shown microcomputer provided in the apparatus.

| Kind of Disk | Position of Carrier | | |
| --- | --- | --- | --- |
| | Position in FIG. 7 | Position in FIG. 8 | Position in FIG. 9 |
| 12" | H | H | H or L |
| 8" | L | H | H or L |
| 5" | L | L | H |
| no disk | L | L | L |

*H and L represent "high" and "low" respectively.

After the determination as to whether the disk is the video disk 1, the video disk 2, or the digital audio disk 3 and the determination of the existence of the disk have been performed on the basis of the output of the second detection means 26, the carrier 4 is further moved into the inside of the casing 5. The carrier 4 is stopped moving once at the disk-up position shown in FIGS. 4 and 10. If the kind of the disk detected at this time is the same as the stored kind of disk detected the last time, it is not always necessary to stop the carrier 4. The disk-up position can be detected by the above-mentioned encoder.

In the above-mentioned disk-up position, the center hole of the video disk 1 or 2 comes just above the video disk turntable 24.

Figure 11:
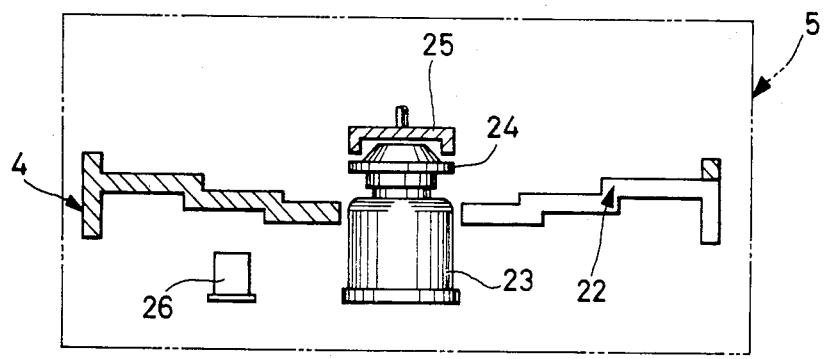

Thereafter, the carrier 4 descends and the video disk 1 or 2 is mounted on the turntable 24 and clamped by th clamper 25. Accordingly, the turntable 24 and the video disk 1 or 2 are integrally rotated by the motor 23. At that time, as shown in FIG. 11, the carrier 4 descends to a position in which the carrier does not contact the disk 1 or 2 and in which the carrier 4 stands by (the second position).

If the disk mounted on the carrier 4 is the digital audio disk 3, the movable portion 28 separated by the dividing line 27 from the rest of the carrier 4 is moved backwards under the condition that the digital audio disk 3 is mounted on the movable portion 28. Further, a not-shown motor and turntable for the digital audio disk 3 are disposed behind the motor 23 and the turntable 24 for the video disks 1 and 2. The movable portion 28 is moved to the disk pick-up position corresponding to the motor and the turntable for the digital audio disk and is stopped there. Thereafter, the carrier 4 descends to the stand-by position similarly to the case of the video disk 1 or 2 and the digital audio disk 3 is clamped to the turntable so as to be integrally rotated with the turntable.

Figure 12:
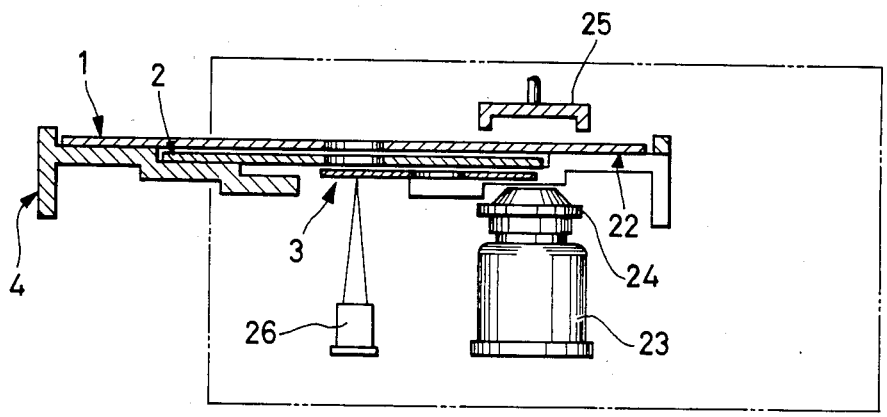
FIG. 12 is an explanatory view showing an operation steps of a carrier in another embodiment according to the present invention.
Figure 10:
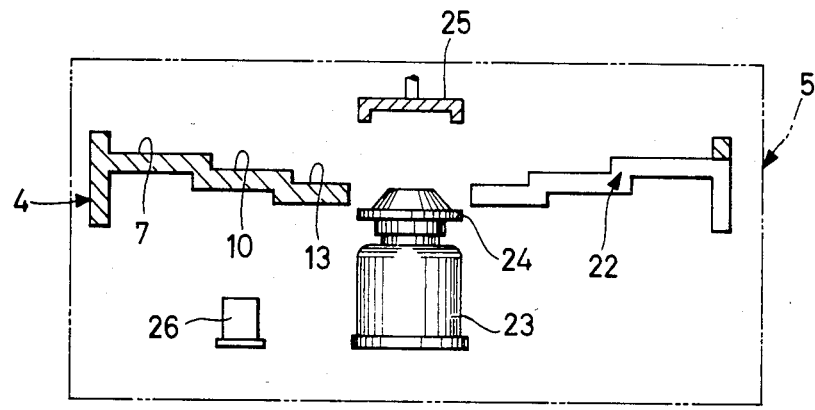

FIG. 12 is a vertical cross section showing another embodiment, in which a digital audio disk 3 is moved relative to the video disks 1 and 2 by a movable portion 28, on the way of the operation.

The movement of a carrier 4 is similar to the case shown in FIGS. 6 through 11. However, only the situation shown in FIG. 9 results in a different position of the disk. In this position, a reflection surface of the digital audio disk 3 and the respective center holes of the video disk 1 of 12 inches and the video disk 2 of 8 inches are aligned and come just above the second detection means 26. The output of the second detection means 26 in this embodiment varies as show in the table below.

Position of Carrier

As a result, if the video disk 1 or 2 and the digital audio disk 3 are erroneously double mounted, it is possible to determine the double mounting so as to be effective as a fail-safe system.

The disk detecting apparatus according to the present invention includes a carrier 4 on which can be mounted a disk 1, 2 or 3 and which is movable between a first position at which the disk 1, 2 or 3 is

| Kind of Disk | Position in FIG. 7 | Position in FIG. 8 | Position in FIG. 11 |
| --- | --- | --- | --- |
| 12" | H | H | L |
| 8" | L | H | L |
| 5" | L | L | H |
| Double mount | H or L | H | H |
| no disk | L | L | L | attached/detached into/from a casing 5 and a second position at which the carrier 4 stands by after mounting the disk 4 on a turntable. Driving means move the carrier 4 between the first and second positions. A first detection means interlocked with the driving means detects the position of the carrier 4. A second detection means detects the existence and type of the disk 1, 2 or 3 through an opening 22 formed in the carrier 4.

That is, the apparatus is arranged such that the difference in kinds of the disks 1, 2, and 3, and their existence are detected through the opening portion 22 through which the movement of a pickup and the movement of the carrier relative to a turntable are allowed. Therefore, it is not necessary to provide special detection holes in the carrier 4 so that its appearance is improved.

The second detection means 26 for detecting three types disks 1, 2, and 3 which are different in size is provide by only one detector, regardless of the kinds of disks, so that the circuit arrangement is simplified, thereby making it possible to reduce the cost.

What is claimed is:

1. A disk detecting apparatus comprising:
   a casing;
   a turntable in said casing;
   a carrier moveable between a first position wherein a disk may be loaded on said carrier and a second position wherein said carrier is centered in said casing over said turntable, said carrier including a plurality of disk mounting surfaces and a plurality of position restriction portions for mounting disks having different diameters on respective ones of said disk mounting surfaces;
   first detecting means for detecting the position of said carrier; and
   second detecting means positioned in said casing for detecting the presence of a disk on said carrier adjacent said detecting means at several successive positions of said carrier as said carrier moves from said first position to said second position, whereby the number of carrier positions at which said second detecting means detects the presence of said disk is an indication of the diameter of said disk.

2. A disk detecting apparatus according to claim 1, wherein said first detection means comprises an encoder and said second detection means comprises a reflection sensor.

3. A disk detecting apparatus as recited in claim 1, wherein said disk mounting surfaces mount each of said disks having different diameters so as to be centered along a common axis when said carrier is at said first position.

4. A disk detecting apparatus as recited in claim 3, wherein said carrier comprises a main portion and a movable portion, said movable portion being movable into and away from said main portion of said carrier along a direction of a path between said first and second position and including said disk mounting surface for a smallest one of said disks, said disk mounting surface of a largest one of said disks being included in said main portion of said carrier.

5. A disk detecting apparatus as recited in claim 4, wherein said detecting means detects the presence of said disk through an opening formed in said movable portion of said carrier.

6. A disk detecting apparatus as recited in claim 1, wherein said disk mounting surfaces mount a largest one and a smallest one of said disks to be centered along different axes when said carrier is at said first position.

7. A disk detecting apparatus according to claim 4, wherein said first detection means comprises an encoder and said second detection means comprises a reflection sensor.

8. A disk detecting apparatus as recited in claim 1, wherein said second detection means consists of a single light emitter and a single light detector.

9. A disk detecting apparatus as recited in claim 4, wherein said second detection means consists of a single light emitter and a single light detector.

* * * * *